(12) United States Patent
Sunkavalli et al.

(10) Patent No.: US 10,936,909 B2
(45) Date of Patent: *Mar. 2, 2021

(54) LEARNING TO ESTIMATE HIGH-DYNAMIC RANGE OUTDOOR LIGHTING PARAMETERS

(71) Applicant: ADOBE INC., San Jose, CA (US)

(72) Inventors: Kalyan K. Sunkavalli, San Jose, CA (US); Sunil Hadap, Dublin, CA (US); Jonathan Eisenmann, San Francisco, CA (US); Jinsong Zhang, Québec (CA); Emiliano Gambaretto, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/188,130

(22) Filed: Nov. 12, 2018

(65) Prior Publication Data
US 2020/0151509 A1 May 14, 2020

(51) Int. Cl.
*G06K 9/62* (2006.01)
*G06K 9/46* (2006.01)
*G06T 5/00* (2006.01)

(52) U.S. Cl.
CPC ......... *G06K 9/6257* (2013.01); *G06K 9/4661* (2013.01); *G06K 9/6201* (2013.01);
(Continued)

(58) Field of Classification Search
CPC . G06T 2207/20208; G06T 2207/20084; G06T 2207/20081; G06K 9/4661;
(Continued)

(56) References Cited

U.S. PATENT DOCUMENTS 9,852,499 B2* 12/2017 Ming .................. G06T 5/50
2017/0169313 A1* 6/2017 Choi .................. G06K 9/4628
(Continued)

OTHER PUBLICATIONS

Zhang, J., Sunkavalli, K., Hold-Geoffroy, Y., Hadap, S., Eisenman, J., & Lalonde, J. F. (Jun. 2019). All-Weather Deep Outdoor Lighting Estimation. In Proceedings of the IEEE Conference on Computer Vision and Pattern Recognition (pp. 10158-10166).
(Continued)

*Primary Examiner* — Charlotte M Baker
(74) *Attorney, Agent, or Firm* — Shook, Hardy & Bacon L.L.P.

(57) ABSTRACT

Methods and systems are provided for determining high-dynamic range lighting parameters for input low-dynamic range images. A neural network system can be trained to estimate lighting parameters for input images where the input images are synthetic and real low-dynamic range images. Such a neural network system can be trained using differences between a simple scene rendered using the estimated lighting parameters and the same simple scene rendered using known ground-truth lighting parameters. Such a neural network system can also be trained such that the synthetic and real low-dynamic range images are mapped in roughly the same distribution. Such a trained neural network system can be used to input a low-dynamic range image determine high-dynamic range lighting parameters.

20 Claims, 11 Drawing Sheets
(2 of 11 Drawing Sheet(s) Filed in Color)

(52) U.S. Cl.
CPC ......... *G06K 9/6262* (2013.01); *G06K 9/6267* (2013.01); *G06K 9/6289* (2013.01); *G06T 5/007* (2013.01); *G06T 2207/20081* (2013.01); *G06T 2207/20084* (2013.01); *G06T 2207/20208* (2013.01)

(58) Field of Classification Search
CPC .. G06K 9/6201; G06K 9/6257; G06K 9/6262; G06N 3/0454; G06N 3/08
USPC ......... 382/157, 165, 274, 159, 225; 348/135
See application file for complete search history.

(56) References Cited

U.S. PATENT DOCUMENTS

| | | |
|---|---|---|
| 2018/0359416 A1 | 12/2018 | Hold-Geoffroy et al. |
| 2020/0134787 A1* | 4/2020 | Bouzaraa ................ G06T 5/003 |

OTHER PUBLICATIONS

Barron, J. T., & Malik, J. (2014). Shape, illumination, and reflectance from shading. IEEE transactions on pattern analysis and machine intelligence, 37(8), 1670-1687.
Calian, D. A. Lalonde, J. F., Gotardo, P., Simon, T., Matthews, I., & Mitchell, K. (May 2018). From faces to outdoor light probes. In Computer Graphics Forum (vol. 37, No. 2, pp. 51-61).
Cheng, D., Shi, J., Chen, Y., Deng, X., & Zhang, X. (Oct. 2018). Learning scene illumination by pairwise photos from rear and front mobile cameras. In Computer Graphics Forum (vol. 37, No. 7, pp. 213-221).
Clevert, D. A., Unterthiner, T., & Hochreiter, S. (2015). Fast and accurate deep network learning by exponential linear units (elus). arXiv preprint arXiv:1511.07289.
Georgoulis, S., Rematas, K., Ritschel, T., Fritz, M., Tuytelaars, T., & Van Gool, L. (2017). What is around the camera?. In Proceedings of the IEEE International Conference on Computer Vision (pp. 5170-5178).
Georgoulis, S., Rematas, K., Ritschel, T., Gavves, E., Fritz, M., Van Gool, L., & Tuytelaars, T. (2017). Reflectance and natural illumination from single-material specular objects using deep learning. IEEE transactions on pattern analysis and machine intelligence, 40(8), 1932-1947.
Grosse, R., Johnson, M. K., Adelson, E. H., & Freeman, W. T. (Sep. 2009). Ground truth dataset and baseline evaluations for intrinsic image algorithms. In 2009 IEEE 12th International Conference on Computer Vision (pp. 2335-2342). IEEE.
Hold-Geoffroy, Y., Athawale, A., & Lalonde, J. F. (2019). Deep sky modeling for single image outdoor lighting estimation. arXiv preprint arXiv:1905.03897.
Hold-Geoffroy, Y., Sunkavalli, K., Hadap, S., Gambaretto, E., & Lalonde, J. F. (2017). Deep outdoor illumination estimation. In Proceedings of the IEEE Conference on Computer Vision and Pattern Recognition (pp. 7312-7321).
Hosek, L., & Wilkie, A. (2012). An analytic model for full spectral sky-dome radiance. ACM Transactions on Graphics (TOG), 31(4), 95.
Karsch, K., Sunkavalli, K., Hadap, S., Carr, N., Jin, H., Fonte, R., . . . & Forsyth, D. (2014). Automatic scene inference for 3d object compositing. ACM Transactions on Graphics (TOG), 33(3), 32.
Krizhevsky, A., Sutskever, I., & Hinton, G. E. (2012). Imagenet classification with deep convolutional neural networks. In Advances in neural information processing systems (pp. 1097-1105).
Lalonde, J. F., Efros, A. A., & Narasimhan, S. G. (2012). Estimating the natural illumination conditions from a single outdoor image. International Journal of Computer Vision, 98(2), 123-145.
Nimeroff, J. S., Simoncelli, E., & Dorsey, J. (1995). Efficient re-rendering of naturally illuminated environments. In Photorealistic Rendering Techniques (pp. 373-388). Springer, Berlin, Heidelberg.
Perez, R., Seals, R., & Michalsky, J. (1993). All-weather model for sky luminance distribution—preliminary configuration and validation. Solar energy, 50(3), 235-245.
Preetham, A. J., Shirley, P., & Smits, B. (1999). A Practical Analytic Model for Daylight. In Proceedings of the 26th annual conference on Computer graphics and interactive techniques—SIGGRAPH (pp. 91-100).
Rematas, K., Ritschel, T., Fritz, M., Gavves, E., & Tuytelaars, T. (2016). Deep reflectance maps. In Proceedings of the IEEE Conference on Computer Vision and Pattern Recognition (pp. 4508-4516).
Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham.
Xiao, J., Ehinger, K. A., Oliva, A., & Torralba, A. (Jun. 2012). Recognizing scene viewpoint using panoramic place representation. In 2012 IEEE Conference on Computer Vision and Pattern Recognition (pp. 2695-2702). IEEE.
Zhang, J., & Lalonde, J. F. (2017). Learning high dynamic range from outdoor panoramas. In Proceedings of the IEEE International Conference on Computer Vision (pp. 4519-4528).
Zhang, Jinsong, and Jean-Francois Lalonde. "Learning high dynamic range from outdoor panoramas." Proceedings of the IEEE International Conference on Computer Vision. 2017.
Hold-Geoffroy, Yannick, et al. "Deep outdoor illumination estimation." Proceedings of the IEEE Conference on Computer Vision and Pattern Recognition. 2017.
Lalonde, Jean-Francois, and Iain Matthews. "Lighting estimation in outdoor image collections." 2014 2nd International Conference on 3D Vision. vol. 1. IEEE, 2014.
Lombardi, Stephen, and Ko Nishino. "Reflectance and illumination recovery in the wild." IEEE transactions on pattern analysis and machine intelligence 38.1 (2015): 129-141.
HošekHošek, Lukáš, and Alexander Wilkie. "Adding a solar-radiance function to the hošek-wilkie skylight model." IEEE computer graphics and applications 33.3 (2013): 44-52.
Kider Jr, Joseph T., et al. "A framework for the experimental comparison of solar and skydome illumination." ACM Transactions on Graphics (TOG) 33.6 (2014): 1-12.

* cited by examiner

LEARNING TO ESTIMATE HIGH-DYNAMIC RANGE OUTDOOR LIGHTING PARAMETERS

BACKGROUND

When using graphics applications, users often desire to manipulate images by compositing objects into the images or performing scene reconstruction or modeling. Creating realistic results depend on determining accurate lighting related to the original image. In particular, when compositing objects into an image, understanding the lighting conditions in the image is important to ensure that the objects added to the image are illuminated appropriately so the composite looks realistic. Determining lighting, however, is complicated by scene geometry and material properties. Further, outdoor scenes contain additional complicating factors that affect lighting such as clouds in the sky, exposure, and tone mapping. Conventional methods of determining lighting in outdoor scenes have had limited success in attempting to solve these problems. In particular, conventional methods do not accurately determine lighting for scenes with such complicating factors (e.g., generated accurate composite images where the sky has clouds).

SUMMARY

Embodiments of the present disclosure are directed towards a system trained to estimate high-dynamic range lighting from a single low-dynamic range image of an outdoor scene. In accordance with embodiments of the present disclosure, such a system can be created using one or more neural networks. In this regard, neural networks can be trained to assist in estimating high-dynamic lighting parameters by leveraging the overall attributes of high-dynamic lighting.

Training of the neural network system is accomplished using a training set of low-dynamic range panoramic images. A subset of the low-dynamic range images in the training dataset can be synthetic images generated from synthetic high-dynamic range images with known lighting. The known lighting can be used to train the network for errors. Errors can be determined by comparing simple scenes rendered with known and estimated lighting. Errors can be based on differences between a simple scene rendered using estimated lighting parameters from the neural network system and the same simple scene rendered using known ground-truth lighting parameters. Such a neural network system can also be trained such that the synthetic and real low-dynamic range images are analyzed in the same manner by the neural network system. Upon completion of training, the output of the system may be used as an estimation of lighting for the image to accurately illuminate composite objects or an entire scene for scene reconstruction.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

This patent or application file contains at least one drawing executed in color. Copies of this patent or patent application publication with color drawings will be provided by the Office upon request and payment of the necessary fee.

DETAILED DESCRIPTION

Figure 1A:
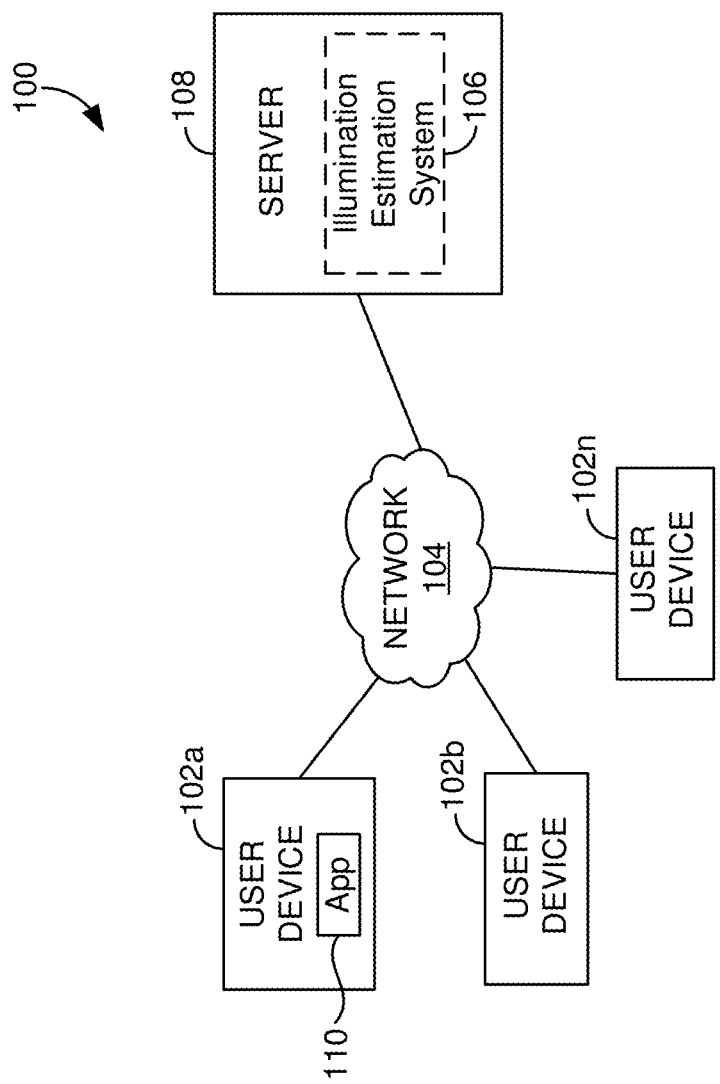
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire to manipulate images, for example, by performing manipulations in image composition, scene reconstruction, and/or three dimensional modeling. To achieve realistic results when compositing an object into an image, the object added to the image should be lighted similarly to the rest of the image (e.g., the shadow casted from the object should match the other shadows in the image). As such, it is important to accurately determine lighting affecting the original input image.

Some conventional systems rely on using hand-crafted features extracted from an image to estimate the lighting for the image. In particular, contrast and shadows can be determined for the features to try to estimate the lighting. However, this method is quite brittle because the lighting determined from hand-designed features tends to fail in a lot of cases.

Images taken with conventional cameras are often low-dynamic range (LDR) images. However, LDR images have a limited range of pixel values. Often, this limited range of pixels in LDR images means that lighting determined from such images will not accurately reflect the lighting of the scene in the image. High-dynamic range (HDR) images, on the other hand, often contains a broad dynamic range of lighting for an image (e.g., entire). Because a larger range of pixel values are available in HDR images, lighting determined from such images is much more accurate. Objects added to an image using lighting determined from HDR images can be rendered to accurately imitate the lighting of the overall image. As such, to accurately add objects to LDR images, the LDR images can be converted to HDR images to determine HDR lighting parameters such that objects can accurately be added to the LDR images.

Conventional methods have attempted to use LDR images to determine HDR lighting. Unlike lighting determined from a LDR image, HDR lighting captures the entire dynamic range of lighting present in an image. For instance, such methods fit a HDR parametric lighting model to a large-scale dataset of low-dynamic range 360 degree panoramas using pure optimization. This optimization can then be used to label LDR panoramas with HDR parameters. Such methods that use optimization can often take into account sun position, haziness, and intensity. The problem with such optimization methods is that while they are successful at locating the sun in a 360 degree panorama, in general, if the image has any clouds in the sky, they are not robust at determining accurate lighting. This leads to erroneous estimates of for lighting in an image when the sky has clouds. Further, LDR panoramas have reduced sun intensity values due to the inherent pixel value constraints in a LDR image. This impacts the ability of the optimization to find good HDR sunlight parameters, regardless of the presence of clouds. Other methods attempt to directly predict pixel values for HDR lighting for an entire panorama. For instance, by converting LDR panoramas to HDR panoramas and fitting a parametric lighting mode to the HDR panoramas. However, such methods directly predict pixel values of HDR lighting and focus on determining values for every pixel in the panorama. Predicting values for every pixels computationally expensive and inefficient. Further, such methods, are not able to generate robust estimates of intensity and cloudiness for images with cloudy skies. Such methods do not always determine realistic high-dynamic lighting properties and require significant computational resources.

Accordingly, embodiments of the present disclosure are directed to facilitating accurate illumination estimation of HDR lighting based on a single LDR image. Estimated HDR lighting parameters can be used for editing and manipulating digital images (e.g., composition of objects into an image using realistic lighting). As used herein, dynamic range can refer to an indication of a range between the brightest and darkest parts of a scene or an image. A HDR image can have any ratio higher than 255:1. For example, a HDR image may have a pixel range of up to 100,000:1. A LDR image has any ratio equal to or less than 255:1.

At a high level, realistic illumination estimations can be determined using a neural network system. A neural network is a computational approach loosely based on how the brain solves problems using large clusters of connected neurons. Neural networks are self-learning and trained to generate output reflecting a desired result. As described herein, a neural network system, such as an illumination estimation neural network system, can be trained using at least one neural network within the system. In such a system, a neural network can be trained to infer, from a single input image, an estimation of the illumination of an environment that includes a scene depicted in the input image and can generate output representing that estimation. Although generally described as one neural network, any number of neural networks can be trained in accordance with embodiments described herein.

As mentioned, the illumination estimation system can use a trained neural network to estimate HDR lighting parameters from a single LDR panoramic image using deep learning. In particular, the neural network is trained to estimate HDR lighting parameters from an input LDR image. The input LDR images can be compressed into a compact set of physically meaningful and representative parameters that can be learned by the neural network. During training, the illumination estimation system minimizes loss between the estimated lighting parameters and the ground truth lighting parameters such that they system learns to predict accurate lighting parameters.

More particularly, the illumination estimation system trains the neural network using a set of LDR panoramic images. For example, the system can use a set of outdoor LDR panoramic images generated from a corresponding set of outdoor HDR panoramic images. The illumination estimation system uses the set of outdoor HDR panoramic images to identify ground-truth lighting parameters for each of the outdoor LDR panoramic images.

Generally, the equation used to determine HDR lighting for an image is a non-differentiable function. Non-differentiable functions typically cannot be incorporated as parameters learnable by a neural network. As such, the present disclosure leverages the overall attributes of HDR lighting to make the HDR lighting function differentiable. Specifically, HDR lighting parameters can be turned into a differential function by splitting the overall lighting of an image into environmental light and sun light. Environmental light is the subtle lighting in an image from the environment that can change the overall shading intensity (e.g., not from the sun). Environmental light can be estimated from an input LDR image. Sun light has a more dramatic effect on objects than environmental light and can light objects and cast shadows. Sun light can include intensity and cloudiness. Intensity can generally be described as how bright the sun is in an image. Cloudiness can generally be described as how cloudy the sky in the image is or the sharpness of the shadows in the image.

After HDR lighting parameters are estimated for an input LDR image, the illumination estimation system compares the estimated HDR parameters with ground-truth lighting parameters. The ground-truth scene can be rendered with known HDR lighting parameters. Such a scene used for determining errors in the neural network can be a basic three-dimensional scene to which lighting parameters can easily be applied (e.g., a scene of geometric primitives, such as spheres, with varying surface material properties). It is advantageous to use rendered scenes to correct errors in the neural network because rendering a three-dimensional scene with HDR lighting is very computationally expensive. It is possible to pre-render the scene for the various lighting properties that comprise HDR lighting properties. Because lighting is linear and additive, these pre-rendered scenes can then be added together to generate a scene with estimate HDR lighting properties. Splitting the HDR lighting properties allows for computational savings because only light that changes needs to be re-rendered.

In particular, the illumination estimation system can use pre-rendered scenes based on the split lighting parameters. The basic three-dimensional scene can be rendered using known environmental light from an input LDR image. Further, the scene can be rendered under different levels of cloudiness and intensity. During training, a cloudiness level can be selected and multiplied by an estimated intensity to estimate sun light of the scene. A pre-rendered scene corresponding to the cloudiness level and estimated intensity can be selected and combined with the environmental light scene. Pre-rendering in this way makes the process of rendering a scene with HDR lighting quick and efficient when training the neural network system. Such a technique can be used to generate an estimated rendered scene using the parameters estimated by the neural network.

This estimated rendered scene can be compared with a scene generated using a set of ground-truth lighting parameters. Specifically, in embodiments, the illumination estimation system can render an image-based lighting (IBL) scene to use as ground-truth for training the neural network. This IBL scene is generated using known HDR lighting parameters associated with a HDR outdoor panorama scene used to generate the LDR image input into the neural network. This allows the illumination estimation system to use accurate, HDR information to train the neural network for any errors.

This process can be repeated for a sufficiently large number of training cycles, until the neural network system converges to a state where the error of the calculations is small enough such that estimated rendered scene reach a desired threshold level of similarity to the ground-truth IBL rendered scenes.

By training and utilizing a neural network in accordance with the systems and methods described herein, the illumination estimation system, more accurately estimates HDR lighting for LDR images. Whereas conventional systems have difficulty predicting lighting for scenes with cloudy skies, the illumination estimation system can accurately estimate HDR lighting parameters that take into consideration how these lighting conditions affect a scene. Determining more accurate estimations of lighting parameters, further enables more accurate digital image alterations, better (e.g., more realistic) virtual object rendering, etc.

The present disclosure can be combined with the methods and systems described in application Ser. No. 15/621,444, herein incorporated by reference. Specifically, the present disclosure can be implemented to convert a large scale LDR panorama data set into a HDR data set. These HDR images can then be cropped and used to train a further neural network system to predict HDR parameters for limited-field-of-view LDR images.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out HDR lighting estimation from a LDR image (e.g., of an outdoor panoramic scene). In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate HDR lighting estimation from a single LDR image. In embodiments, the LDR image can be a 360 degree panorama scene. A LDR image can be a still image or taken from a video. In some cases, a LDR image can be selected or input in any manner. For example, a user may take a picture using a camera function on a device. As another example, a desired image can be selected from a repository, for example, a repository stored in a data store accessible by a network or stored locally at the user device 102a. In other cases, an image may be automatically selected or detected. Based on the input LDR image, (e.g., provided via a user device or server), HDR estimations can be performed to determine HDR lighting parameters for the input image. The HDR lighting parameters can be output to a user, for example, to the user via the user device 102a. In this regard, the HDR lighting parameters can be displayed via a display screen of the user device. In other embodiments, the HDR lighting parameters can be automatically applied to objects composited with the input image. As an example, application 110 can be ADOBE DIMENSION (e.g., utilizing a Match Image Sunlight feature).

As described herein, server 108 can facilitate HDR lighting estimation from a LDR image via illumination estimation system 106. Server 108 includes one or more processors, and one or more computer-readable media. The computer-readable media includes computer-readable instructions executable by the one or more processors. The instructions may optionally implement one or more components of illumination estimation system 106, described in additional detail below.

Illumination estimation system 106 can train and operate a neural network system in order to estimate HDR lighting parameters from a single LDR panorama image. Such a neural network system can be comprised of one or more neural networks trained to generate a designated output. Once trained, the neural network can estimate HDR lighting parameters for an input LDR scene.

For cloud-based implementations, the instructions on server 108 may implement one or more components of illumination estimation system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of illumination estimation system 106 may be implemented completely on a user device, such as user device 102a. In this case, illumination estimation system 106 may be embodied at least partially by the instructions corresponding to application 110.

Figure 1B:
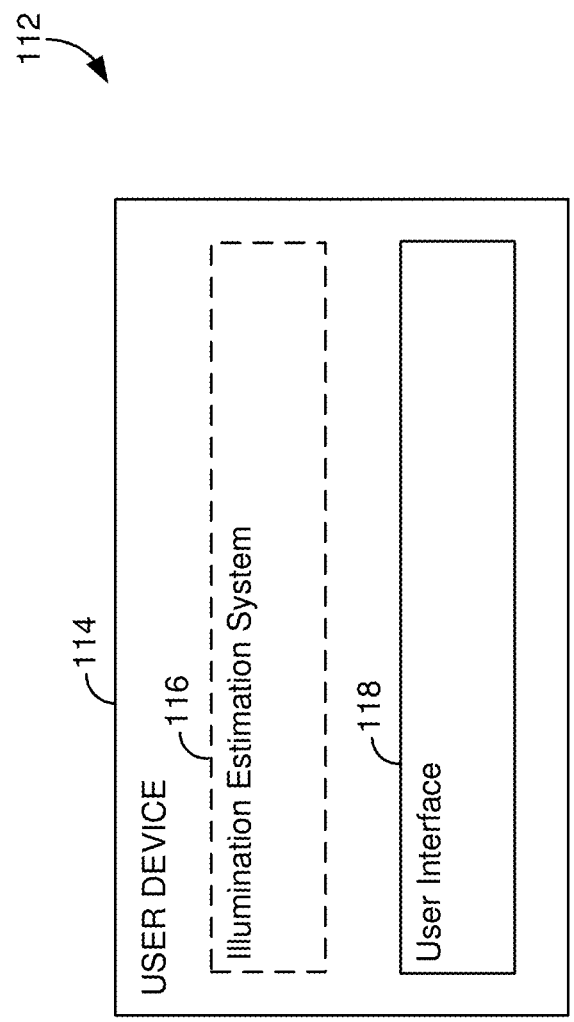
FIG. 1B depicts an example configuration of an operating environment in which some implementations of the present disclosure can be employed, in accordance with various embodiments.

Referring to FIG. 1B, aspects of an illustrative illumination estimation system are shown, in accordance with various embodiments of the present disclosure. FIG. 1B depicts a user device 114, in accordance with an example embodiment, configured to allow for estimating HDR lighting from an LDR image using a illumination estimation system. The user device 114 may be the same or similar to the user device 102a-102n and may be configured to support the illumination estimation system 116 (as a standalone or networked device). For example, the user device 114 may store and execute software/instructions to facilitate interactions between a user and the illumination estimation system 116 via the user interface 118 of the user device.

A user device can be utilized by a user to perform illumination estimation. In particular, a user can select and/or input a LDR image to identify HDR lighting for the image utilizing user interface 118. An image can be selected or input in any manner. The user interface may facilitate the user accessing one or more stored images on the user device (e.g., in a photo library), and/or import images from remote devices and/or applications. As can be appreciated, images can be input without specific user selection. Images can include frames from a video. Based on the input and/or selected image, illumination estimation system 116 can be used to perform HDR lighting estimation of the image using various techniques, some of which are further discussed below. User device 114 can also be utilized for displaying the determined lighting parameters.

Figure 2:
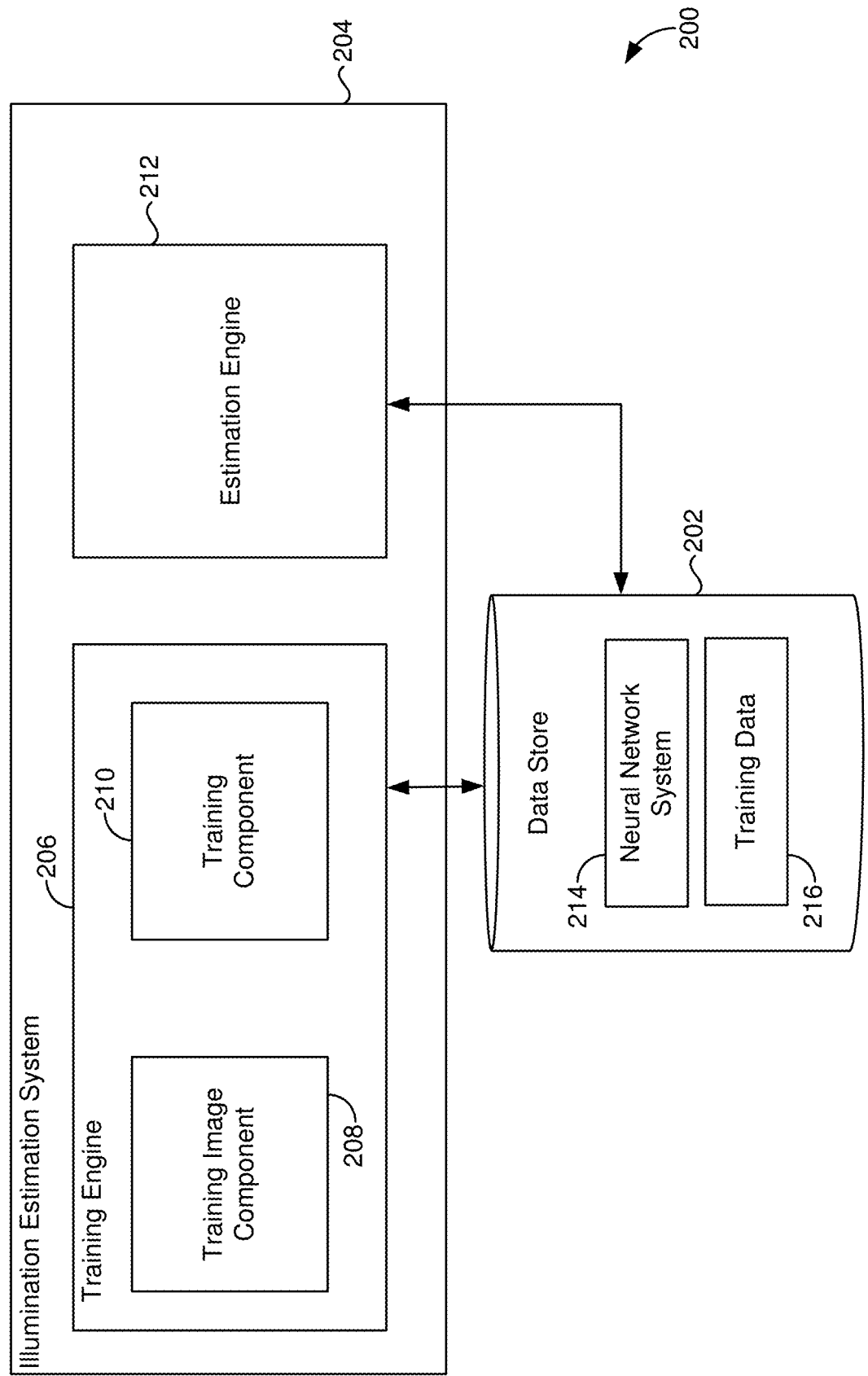
FIG. 2 depicts an example configuration of an operating environment in which some implementations of the present disclosure can be employed, in accordance with various embodiments of the present disclosure.

FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10. It should be understood that operating environment 200 shown in FIG. 2 is an example of one suitable operating environment. Among other components not shown, operating environment 200 includes a number of user devices, networks, and server(s).

Illumination estimation system 204 includes training engine 206 and estimation engine 212. The foregoing engines of illumination estimation system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the illumination estimation system.

As shown, an illumination estimation system can operate in conjunction with data store 202. Data store 202 can store computer instructions (e.g., software program instructions, routines, or services), data, and/or models used in embodiments described herein. In some implementations, data store 202 can store information or data received via the various engines and/or components of illumination estimation system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include images used for training the illumination estimation system. Such images can be input into data store 202 from a remote device, such as from a server or a user device.

In embodiments, data stored in data store 202 includes training data 216. Training data generally refers to data used to train a neural network, or portion thereof. As such, training data 216 can include HDR real sky images, synthetic HDR panorama images, training LDR images, IBL render images, estimated render images, pre-rendered lighting parameter scenes, or the like. In some cases, data store 202 receives data from user devices (e.g., an input image received by user device 202a or another device associated with a user, via, for example, application 210). In other cases, data is received from one or more data stores in the cloud.

Data store 202 can also be used to store neural network system 214. Such a neural network system may be comprised of one or more neural networks, such as a neural network trained to estimate HDR lighting parameters for an input LDR image. One implementation employs a convolutional neural network architecture.

Training engine 206 may be used to train neural network system 214 to estimate HDR illumination of a LDR panorama image. As depicted in FIG. 2, training engine 206 includes a training image component 208 and a training component 210. Although these components are illustrated separately, it can be appreciated that the functionality described in association therewith can be performed by any number of components.

Training image component 208 can generally be used to generate and/or modify any image utilized in the training of neural network system 214. Images generated by the training image component can include synthetic HDR panorama images, training LDR images, IBL render images, estimated render images, and pre-rendered lighting parameter scenes.

In implementations, the training image component 208 can generate synthetic HDR images. A synthetic HDR image can be generated using a real HDR image of the sky (e.g., from a HDR real sky database). Such a HDR real sky image has known HDR illumination/lighting properties. These known properties can be used to render an HDR outdoor panorama scene (e.g., a city model). For instance, a realistic outdoor scene can be rendered that also has known HDR lighting parameters. In this way, synthetic HDR images can provide ground-truth lighting parameters during training of the neural network system.

To leverage the known HDR parameters of a synthetic HDR image in training a neural network system, a HDR outdoor panorama scene can be turned into a LDR image of the scene. This LDR version can then be used as a training LDR image that is input into the neural network system. In some aspects, a LDR image includes a panorama of an outdoor scene with an angle of view being 360 degrees. An LDR image typically has pixel values that go from 0 to 255. When a training LDR image is input into the neural network system, the system can output an estimate of HDR lighting parameters for the image. In the disclosed implementations, the output includes HDR lighting parameters. The lighting parameters of the corresponding synthetic HDR image (e.g., the synthetic HDR image used to generate the training LDR image) can be used to determine errors made by the estimation made by the neural network system. Specifically, in embodiments, output lighting parameters can be used to render an estimated render image that can be compared with an IBL render image having the lighting parameters of the corresponding synthetic HDR image. In this way, the IBL render image can act as the ground-truth for determining errors in the neural network system when estimating HDR lighting parameters.

Training image component 208 can also generate IBL render images to be used as ground-truth when evaluating the output from the neural network system. When training the one or more neural networks in the neural network system, the output generated by the system is evaluated to determine any errors. One manner for determining errors is by determining differences between the output by the system and an expected, or ground-truth, output. Errors can include inaccuracies, flaws, variations, and/or divergences between the training output and the desired output, often referred to as the ground-truth or output if the network was perfectly trained. Such errors can be determined by comparing parameters of the training output and the ground-truth to find a loss function. In some embodiments, updating the neural network involves feeding errors back through the neural network so the algorithm can adjust network connections in order to reduce the value of the error. In embodiments, errors in the present neural network system can be determined using a pixel-wise comparison between a ground-truth IBL render image created using the known lighting parameters from a synthetic HDR image and an estimated render image created using the estimated lighting parameters determined by the neural network for an input training LDR image.

Adjusting the neural network to correct for errors is accomplished by changing at least one node parameter of a neural network. The neural network can comprise a plurality of interconnected nodes with a parameter, or weight, associate with each node. While individual parameters do not have to be specified during training of a neural network, networks tends to learn parameters that identify edge detection, RGB color, textures of features, roughness and/or blur, etc. Each node receives inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

The equation typically used to determine HDR lighting is a non-differentiable function. Non-differentiable functions normally cannot be successfully incorporated into a neural network. As such, the present disclosure leverages the overall attributes of HDR lighting to make the function differentiable and the process computationally tractable.

Specifically, the lighting parameters can be turned into a differential function by splitting the overall lighting of the image into environmental light and sun light, where sun light is made up of intensity and cloudiness. Intensity can generally be defined as how bright the sun is in the input image. Cloudiness can generally be defined as how cloudy the sky is in the input image (e.g., sharp shadows, no shadows, etc.).

Splitting the lighting into various lighting properties makes the process of determining HDR lighting parameters computationally tractable. Specifically, images of the scene can be pre-rendered based on lighting parameters. As such, during training of the neural network, the pre-rendered images that correspond to the lighting of a scene can be easily selected.

Training image component 208 can also be used to pre-render images. An image can be a basic three-dimensional scene (e.g., a scene of three spheres, with varying degrees of roughness, for instance: one smooth, one medium roughness, and one very rough). Pre-rendered scenes can be rendered using the known environmental light. Further, pre-rendered scenes can be rendered using different combinations of parameters of sun light. For instance, the training image component can be used to pre-render the image of the scene under different levels of cloudiness and intensity. During training, a cloudiness level can be selected and multiplied by an estimated intensity to estimate sun light of the scene. This cloudiness level with intensity can be used to select a pre-rendering image of the scene. To determine the full lighting parameters of the scene, the environmental light can be added to the sun light from the intensity and cloudiness. During training, these two pre-rendered images (e.g., scene with environmental light and scene with sun light) can be combined to generate an estimated render image. To determine errors in the neural network, such an estimated render image can be compared with the ground-truth IBL render image. Pre-rendering such images makes this process quickly and efficiently run using a trained neural network system.

Figure 8:
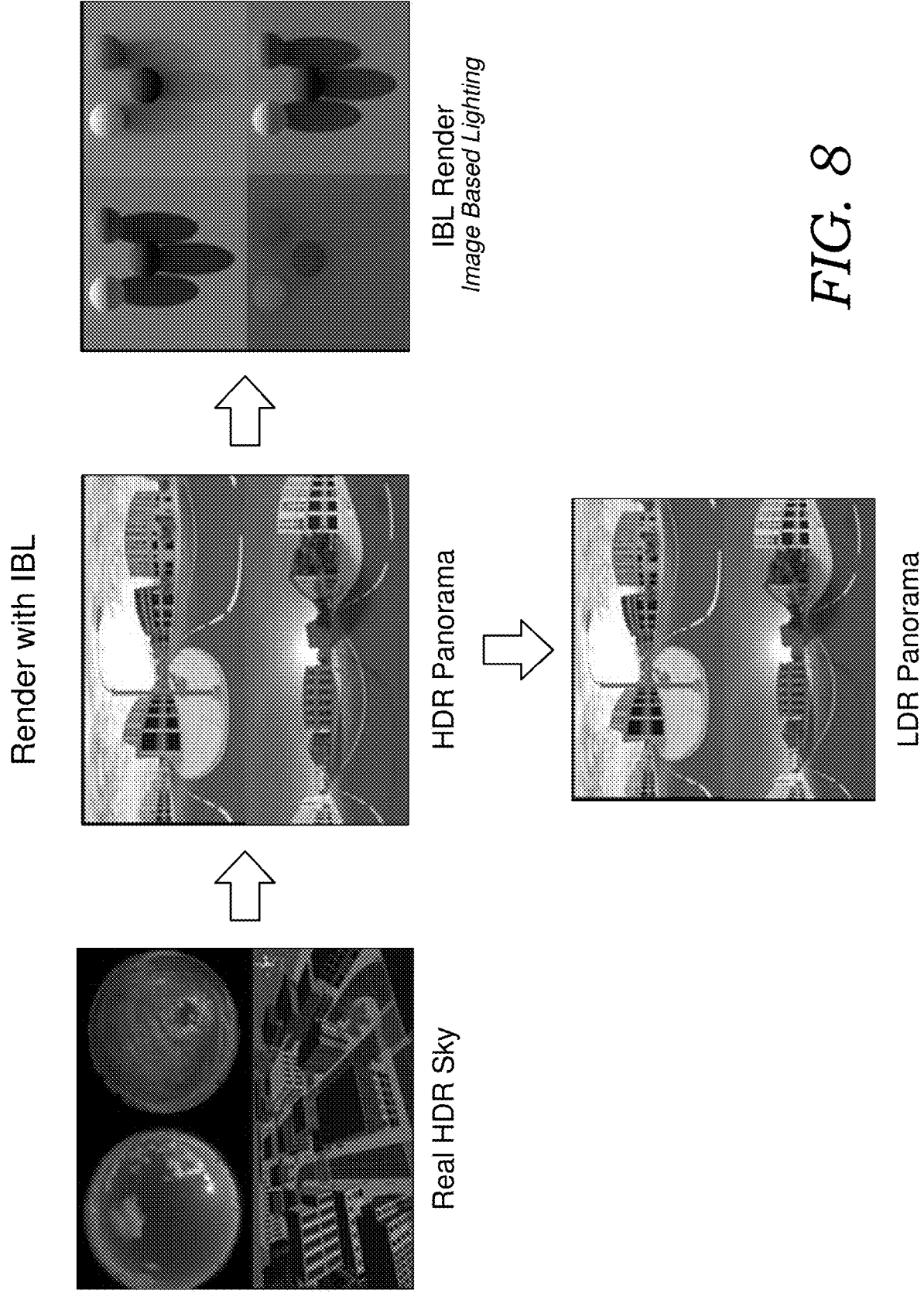
FIG. 8 depicts an example process for generating a synthetic HDR image, a synthetic LDR image, and an associated ground-truth image of a scene, in accordance with embodiments of the present disclosure.

For example, FIG. 8 depicts an example process for generating a synthetic HDR image, a synthetic LDR image, and associated ground-truth image of a scene, in accordance with embodiments of the present disclosure. A real HDR image of the sky 802, may be selected from a HDR real sky database. Such a HDR real sky image has known HDR illumination/lighting properties. These known properties can be used to render HDR outdoor panorama scene 804. This HDR outdoor panorama scene can appear to be a real HDR outdoor panorama of a scene. As depicted, the HDR outdoor panorama scene is rendered using a city model. Using the known HDR illumination lighting properties, IBL render image 806 can be generated. IBL render image 806 can be used as ground-truth when evaluating the output from the neural network system. Further, HDR outdoor panorama scene 804 can be turned into LDR image 808 of the scene. This LDR version can then be used as a training LDR image that is input into the neural network system.

Such training LDR images as described above can generally be described as synthetic images. It should be appreciated that real training LDR images can also be used to train the neural network system, in addition to the synthetic LDR images. Real training LDR images can be non-synthetic, or unaltered, low-dynamic range images.

Generally, the greater amount of training data available, the more accurate a neural network can become. Accordingly, some aspects of the training image component 208 perform data augmentation. Data augmentation includes modifying existing LDR images to generate additional LDR panoramas to use as training LDR images. Accordingly, a single LDR image of an outdoor panorama may provide multiple training LDR images. Data augmentation techniques may include rotating images, mirroring images, changing color contrast levels, adjusting the overall brightness, camera response function, color jittering and/or flipping, and the like. In some aspects, different exposures can be utilized to generate additional training LDR images. Data augmentation may help to reduce overfitting caused by the neural network system by providing additional training images.

Training component 210 may select training LDR images generated by the training image component 208 for training a neural network system. From a training LDR image, the neural network system may output HDR lighting parameters, which may correspond to intensity and cloudiness. The output HDR lighting parameters can be used to generate an estimated render image. In some implementations, this estimated render image may be compared to the corresponding IBL render image to determine errors. In some other implementations, this estimated render image may be evaluated for realism to determine errors. Based on such comparisons, the training component 210 may adjust or modify the neural network system so that the neural network system becomes more accurate and performs accurately on real LDR images. The process of training the neural network system is discussed further with respect to FIG. 3.

The neural network system trained according to the present disclosure may be used to estimate HDR illumination for LDR images input into the system. HDR lighting estimation may be performed using estimation engine 212. The method of estimating HDR lighting from input LDR images may be similar to the process described for training the neural network system; however, in execution, the LDR images input into the system are typically not synthetic LDR images generated from synthetic HDR panoramic images. Accordingly, the HDR lighting parameters for the input images may be unknown, but the trained neural network system may, nevertheless, estimate HDR lighting.

In embodiments, estimation engine 212 may run a trained neural network system to estimate HDR lighting parameters for an input image. The input image can be a LDR image. An input image may be received from a user at a user device. The user may select or input an image in any available manner. For example, a user may take a picture using a camera on a device, for example, user device 102a-102n and/or user device 114 of FIGS. 1A-1B. As another example, a user may select a desired image from a repository stored in a data store accessible by a network or stored locally at the user device 102a-102n and/or user device 114 of FIG. 1A-1B. In other embodiments, a user can input the image by inputting a link or URL to an image. Based on the input image, HDR lighting parameters can be estimated by estimation engine 212.

The HDR lighting parameters may be provided directly to a user via a user device, for example, user device 102a-102n and/or user device 114. In other aspects, the HDR lighting parameters can be used to automatically adjust illumination of a selected image or object within an image to reflect the HDR lighting parameters estimated from the input image.

Figure 3:
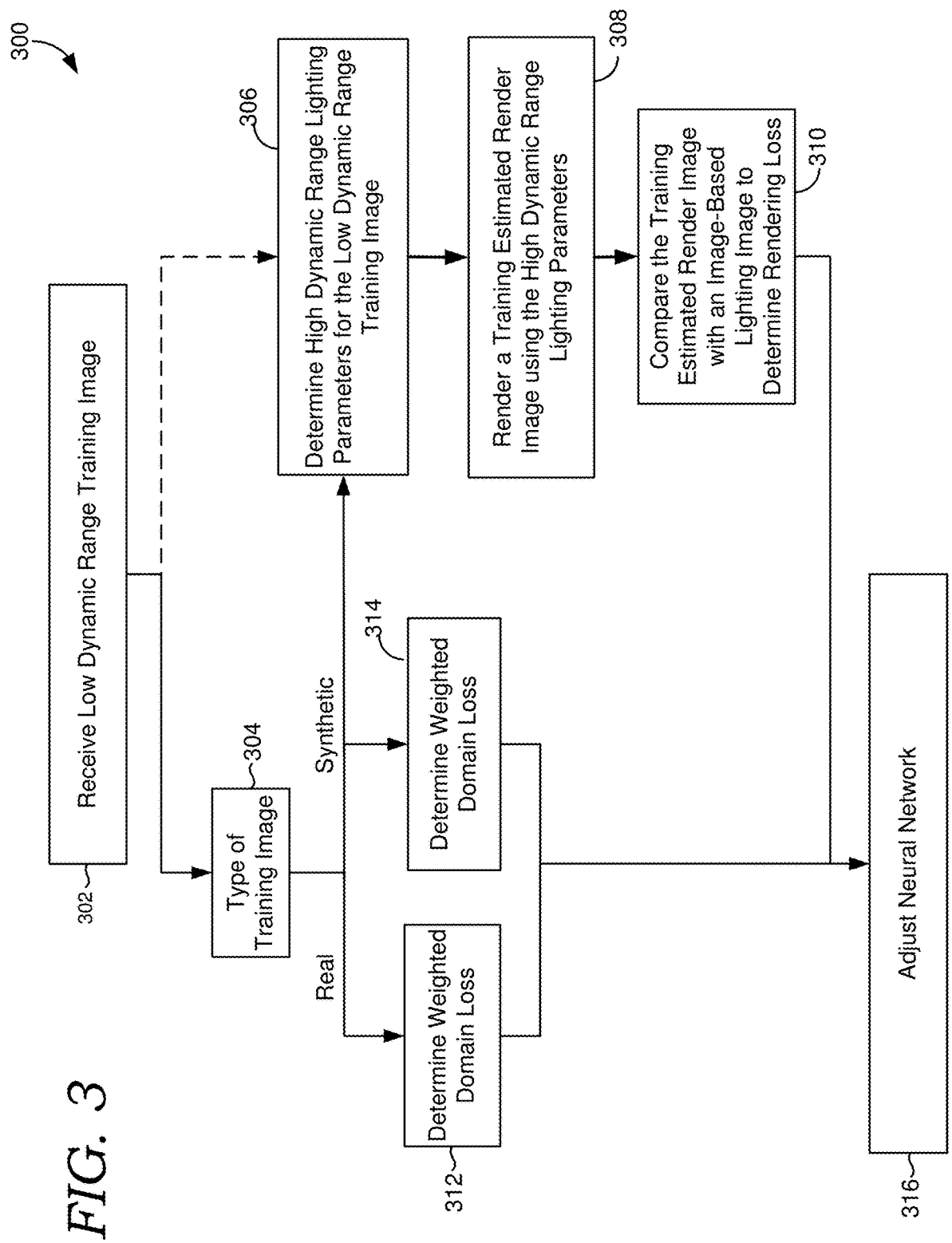
FIG. 3 depicts a process flow showing an embodiment for training a neural network system to estimate HDR lighting parameters from a LDR image, in accordance with embodiments of the present disclosure.

Turning now to FIG. 3, FIG. 3 provides a process flow showing an embodiment of method 300 for training a neural network system to estimate HDR lighting parameters from a LDR image, in accordance with embodiments of the present disclosure. Method 300 can be performed, for example by illumination estimation system 204, as illustrated in FIG. 2. At blocks 302 through 316, method 300 includes steps for training a neural network system. The neural network system used in method 300 as depicted uses one neural network, however, such a neural network system can be comprised of any number of neural networks.

At block 302, a LDR training image can be received. Such an image can be received from, for example, training data 216 stored on data store 202 of FIG. 2 and/or from a database stored in the cloud. In embodiments, a LDR training image can have pixel values no higher than 255:1. Images can be in standard formats such as GIFF, TIFF, and JPEG. The LDR training image can be a panorama (e.g., an image with an enlarged field of view). For example, the LDR training image can be a 360-degree panoramic image. Such 360-degree images of outdoor scenes provide direct views of the sun and sky, including any cloud cover, which are typically the sources of light in an outdoor scene.

At block 304 the type of training image can be determined. A training LDR image can either be a synthetic LDR image or a real LDR image. A synthetic LDR image is generated from a synthetic HDR image (e.g., generated using a real HDR image of the sky and rendered outdoor panoramic scene). A real LDR image can be an unaltered panorama image taken in LDR. Typically for a real LDR image, corresponding HDR lighting parameters are unknown. The type of LDR image can change the type of loss determined to correct errors in the neural network.

At block 306, HDR lighting parameters can be determined for the LDR training image. This can be accomplished using a neural network system. For instance, the neural network can estimate HDR lighting parameters using environmental light and sun light. Specifically, environmental light can be obtained using the lighting of the input LDR training image. Sun light is made up of intensity and cloudiness. A level of intensity can be estimated by the neural network. Further, a level of cloudiness can be estimated by the neural network. It should be appreciated that block 306 can be performed when the training image is synthetic and not when the training image is real.

When the training LDR image is a synthetic LDR image, the method can proceed to 308 where rendering loss can be determined. Rendering loss can be determined by comparing the training estimated render image with a ground-truth IBL image. The ground-truth IBL scene can be generated using known HDR lighting parameters associated with a HDR outdoor panorama scene used to generate the LDR image input into the neural network. Rendering loss can generally be described as a pixel-wise loss between the estimated render image and the ground-truth IBL render image. Specifically, in embodiments, rendering loss can be the difference between the estimated render image and the ground-truth IBL render image using L2 loss.

At block 310, a training estimated render image can be rendered using the HDR lighting parameters estimated by the neural network system. For instance, the training estimated render image can be a basic three-dimensional scene to which lighting parameters can easily be applied (e.g., a scene of three spheres of with varying surface material properties). The training estimated render image can be generated using pre-rendered scenes corresponding to the HDR lighting parameters estimated by the neural network. A pre-rendered image for the environmental light can be obtained. Estimated intensity and cloudiness can be used to obtain a pre-rendered scene corresponding to the parameters. Upon estimating intensity and cloudiness, estimated intensity and cloudiness can be combined and a pre-rendered image can be selected for sun light.

Figure 9:
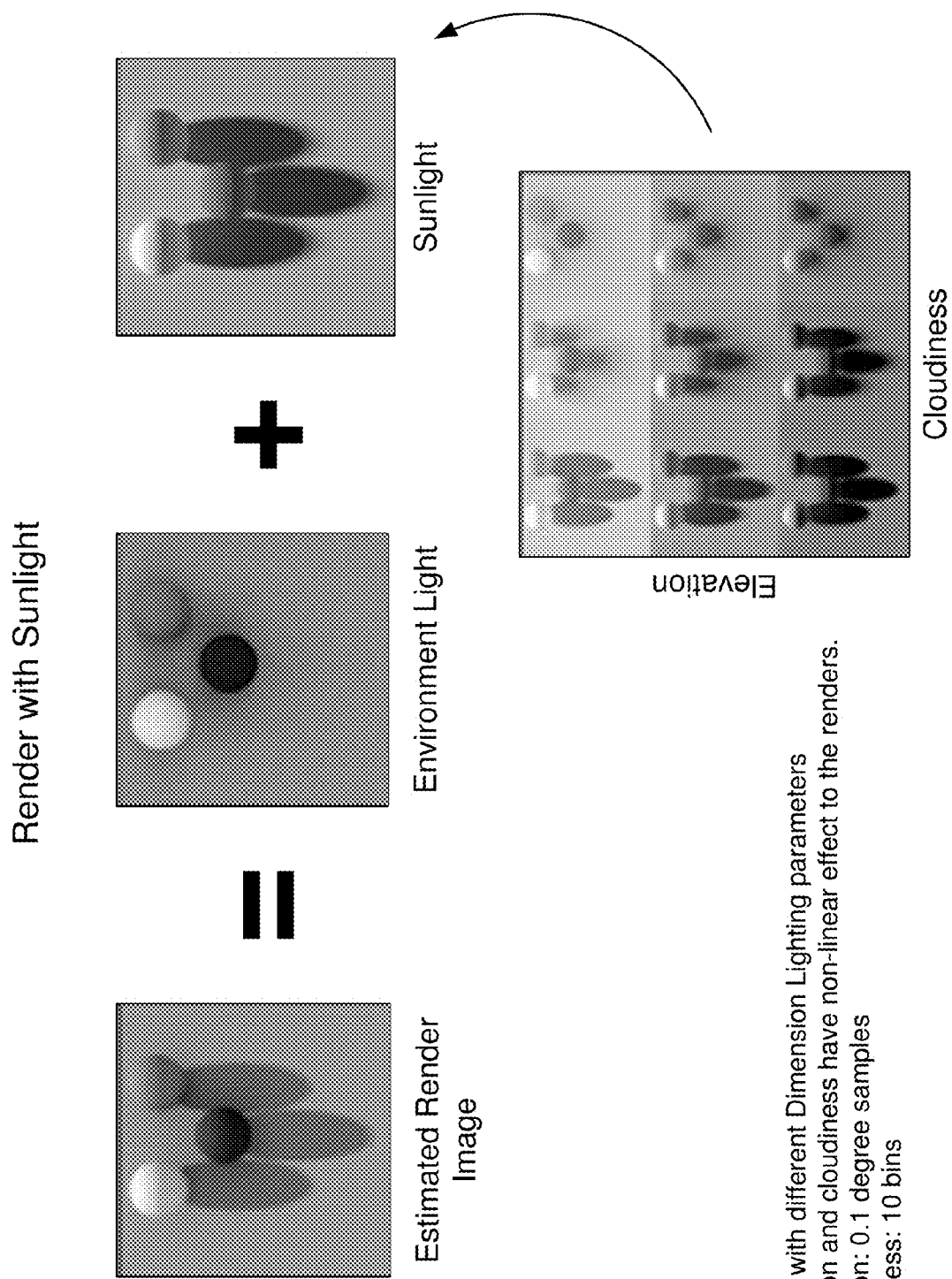
FIG. 9 depicts an example process for generating an estimated render image, in accordance with embodiments of the present disclosure

The pre-rendered image for environmental light and sun light can be rendered into the training estimated render image. For example, FIG. 9 depicts an example process for generating an estimated render image, in accordance with embodiments of the present disclosure. The estimated render image can be generated by selecting and combining pre-rendered images based on determined HDR parameters. Environmental light 902 may be determined using known lighting parameters from a LDR image input into a neural network. These known properties can be used to render the environmental light present in the outdoor panorama scene of the input LDR image. Intensity can be used to select the level of intensity in outdoor scene depicted in the LDR image. Intensity can be sampled based on elevation (e.g., using 0.1 degree samples). Upon determining an intensity level, cloudiness can be determined. Cloudiness is affected by how cloudy the sky is in the input image (e.g., sharp shadows, no shadows, etc.). Cloudiness can be classified based on value (e.g., using 10 "bins") (for instance, cloudiness values can be between 0 and 1). Based on the estimated cloudiness value, a bin can be selected. Intensity and cloudiness have a non-linear effect of the rendered scene. Using determined intensity and cloudiness, a pre-rendered scene can be selected as sun light 904 from pre-rendered scenes 906. Environmental light 902 and sun light 904 can be combined into a final render of estimated render image 908.

When the training LDR image is a real LDR image, the method can proceed to 312 where a weighted domain loss can be determined. Domain loss can be determined using loss similar to generative adversarial loss. For instance, domain loss can be implemented using cross-entropy loss. When the discriminator is able to identify differences between a real LDR image and a synthetic LDR image, the neural network system typically does not perform accurately for real images. In this way, when the discriminator can identify a synthetic LDR image from a real LDR image, the neural network system can be corrected for errors to make the system more accurate for real LDR images.

During training of the neural network system, domain loss can be weighted throughout training such that the loss is emphasized (or deemphasized) at different times. For instance, during the first few training cycles of the neural network system, the domain loss can be weighted as 0 (e.g., domain loss is not accounted for). During training, the weighting of domain loss can gradually increase through the training process up to 1. In embodiments, the weight of domain loss can be set to 1 at roughly half way through the training of the neural network system.

At block 314, weighted domain loss can be determined for a synthetic image as well. Domain loss can be determined using loss similar to generative adversarial loss. The discriminator can be used to discriminate between a latent vector from a real LDR image and a latent vector from a synthetic LDR image. Domain loss can be implemented using cross-entropy loss.

Figure 4:
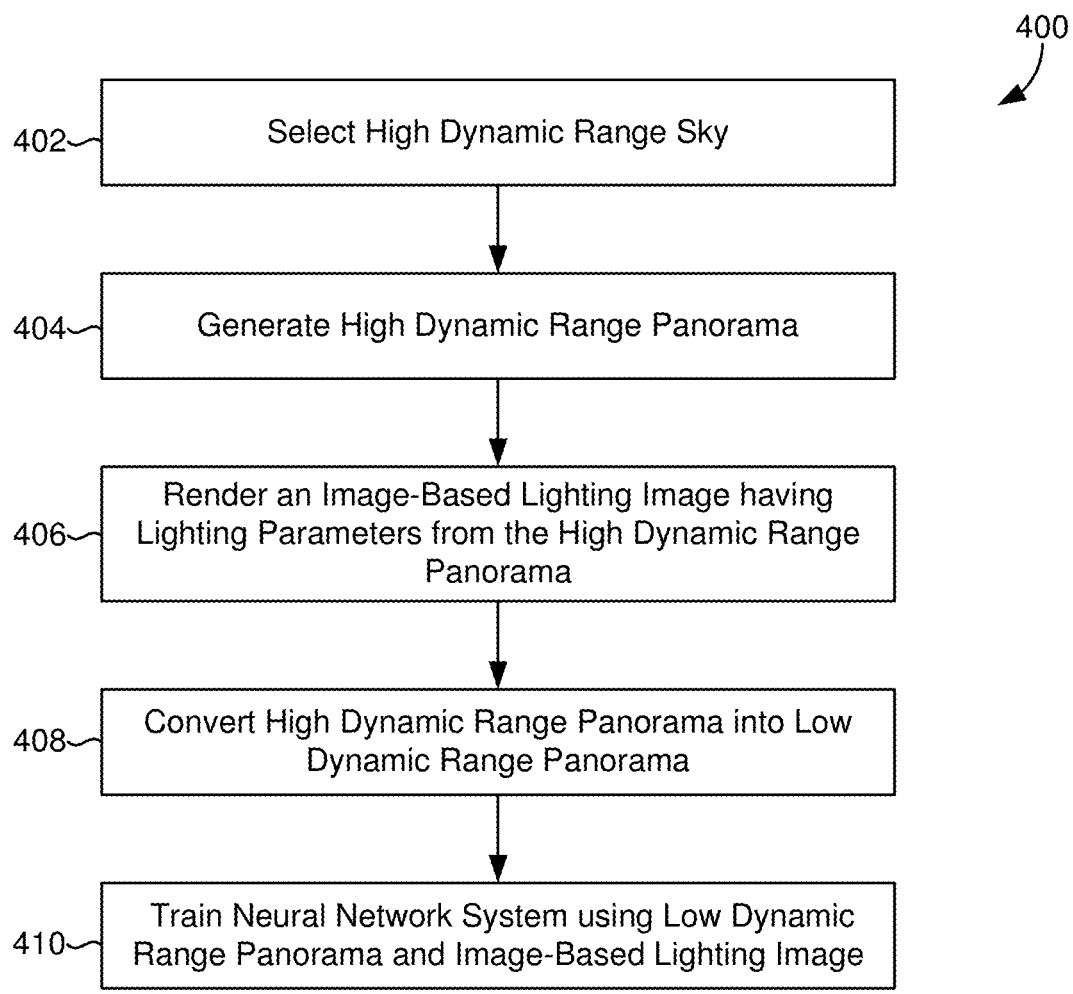
FIG. 4 depicts a process flow showing an embodiment for generating synthetic training LDR images, in accordance with embodiments of the present disclosure.

At block 316, loss determined at 310 and/or loss determined at steps 312-314 can be used to adjust the neural network. It should be appreciated additional types of loss can also be used to correct for errors in the network. Errors determined using loss functions are used to minimize loss in the neural network system by backwards propagation of such errors through the system. As indicated in FIG. 3, blocks 302 through 316 may be repeated any number of times to train the neural network system FIG. 4 provides a process flow showing an embodiment of method 400 for generating synthetic training LDR images, in accordance with embodiments of the present disclosure. Method 400 can be performed, for example by training image component 208 of FIG. 2.

At block 402, a HDR sky image can be selected. A HDR image can be selected from, for example, a database. Such a HDR real sky image has known HDR illumination/lighting properties. The HDR sky image can be used, at block 404, to generate a HDR panorama image. The HDR panorama can be a 360 degree image of an outdoor scene based on the lighting properties of the HDR sky image. For instance, a realistic outdoor scene can be rendered that has known HDR lighting parameters.

At block 406, an IBL render image can be rendered. The IBL image can have lighting parameters from the HDR panorama. For instance, the IBL image reflects a scene with the same lighting parameters as those in the HDR panorama. This IBL image can be used as ground-truth when evaluating the output from the neural network system in order to train the network. It can be computationally inefficient to fit a non-analytical sky model to a real sky. Because the neural network is being trained to estimate HDR lighting that can be applied when rendering objects, renders of object can be used to train the neural network system instead of sky images. In this way, the IBL image can be a dimensional scene rendered with the known HDR lighting.

At block 408, the HDR panorama can be converted into a LDR panorama. An LDR image can be an 8-bit image that has pixel values that go from 0 to 255. A HDR image can be a 32-bit image. To convert a HDR image to a LDR image, for example, image processing applications can be used (e.g., PHOTOSHOP). At block 410, a neural network system can be trained using the LDR panorama and IBL image.

Figure 5:
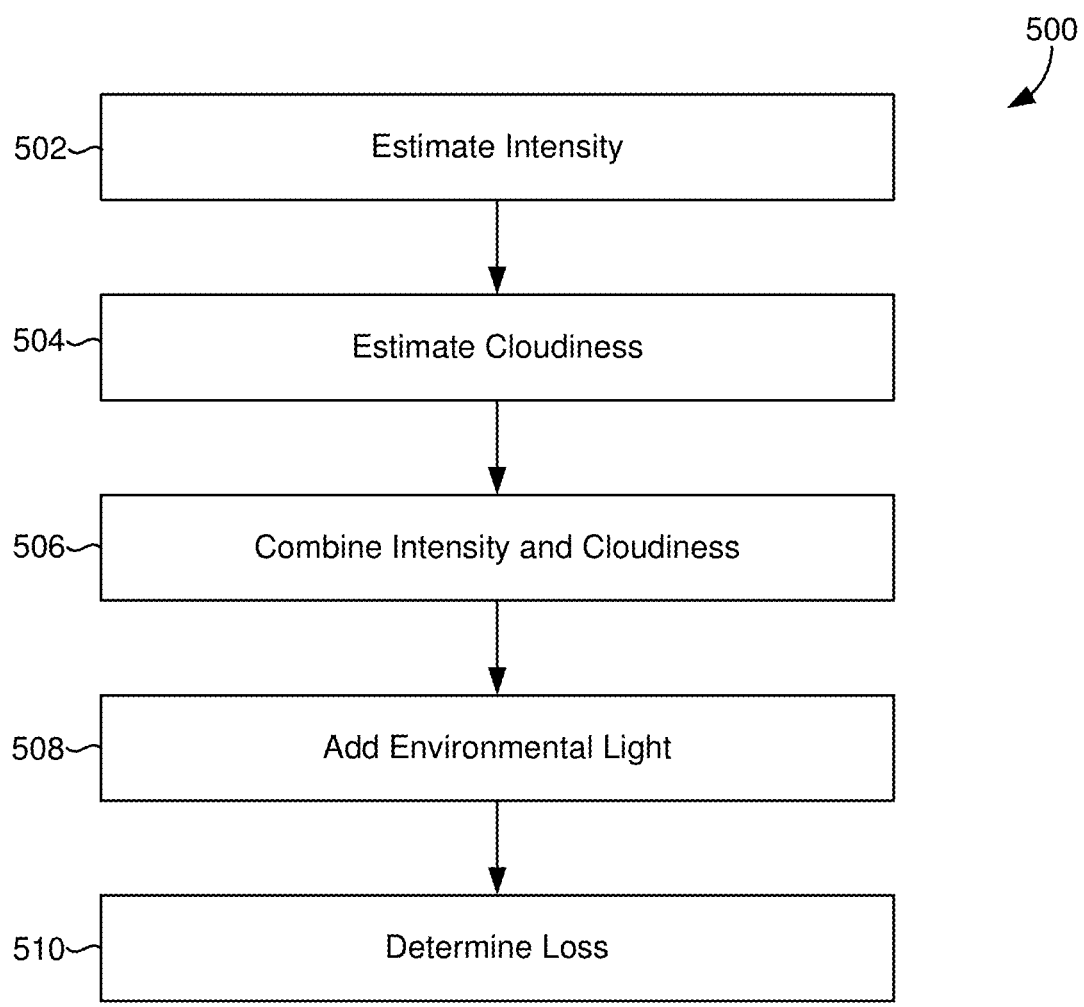
FIG. 5 depicts a process flow showing an embodiment for a neural network estimating HDR lighting parameters, including intensity, cloudiness, and sun position, from a LDR image, in accordance with embodiments of the present disclosure.

FIG. 5 provides a process flow showing an embodiment of method 500 for a neural network estimating HDR lighting parameters, including intensity, cloudiness, and sun position, from a LDR image, in accordance with embodiments of the present disclosure. Method 500 can be performed, for example by illumination estimation system 204, as illustrated in FIG. 2.

Because non-differentiable functions typically cannot be incorporated into a neural network, the present disclosure leverages the overall attributes of HDR lighting to make the function for determining HDR lighting differentiable. Specifically, the lighting parameters can be turned into a differential function by splitting the overall lighting of the image into environmental light and sun light, where sun light is made up of intensity and cloudiness. A non-limiting example of a differential function a neural network system can leverage to determine lighting parameters is provided:

$$I_{ibl} = I_{environment} + i * i_{sun}(c)$$

$I_{ibl}$ can generally be defined as the ground-truth lighting render for the HDR panorama image. $I_{environment}$ can generally be defined as the scene as rendered under environmental light. $I_{environment}$ is a known from a LDR image.

At block 502 the neural network system estimates intensity for a LDR image input into the neural network system, and at block 504 the neural network system estimates cloudiness for the LDR image input into the neural network system. The estimated intensity and cloudiness can be used to select pre-rendered scenes that reflect the estimated intensity and cloudiness parameters along based on sun positioning (e.g. elevation of the sun).

Elevation can affect the intensity of the sun so the sun elevation can be sampled for every 0.1 degree. Each elevation can have associated pre-rendered lighting parameter scenes. Cloudiness can generally be defined as how cloudy the sky is in the input image (e.g., sharp shadows, no shadows, etc.). To determine classification can be used (e.g., 10 "bins"). For instance, cloudiness values can be between 0 and 1. Based on the estimated cloudiness value, a bin can be selected. Each bin can have an associated pre-rendered lighting parameter scenes. As such, upon estimating intensity and cloudiness, at block 506, estimated intensity and cloudiness can be combined and a pre-rendered image can be selected for sun light. In some embodiments, a pre-rendered scene for intensity and a pre-rendered scene for cloudiness can be added together to generate the pre-rendered image for sun light.

At block 508, the pre-rendered image for sun light can be combined with a pre-rendered image for environmental light to generate an estimated render image. The pre-rendered image for environmental light can be generated using the subtle lighting in a LDR image from the environment that changes the overall shading intensity (e.g., not from the sun). Environmental light can be estimated from an input LDR image. The pre-rendered scenes for sun light (comprised of cloudiness and intensity) and environmental light can be combined because such lighting is linear and additive.

Loss can be determined at block 510. For instance, an estimated render image can be compared with a ground-truth IBL render image. The estimated render image is the combination of the pre-rendered scenes for sun light and environmental light. This ground-truth IBL render image can be generated using known HDR lighting parameters associated with a HDR outdoor panorama scene (e.g., used to generate the LDR image input into the neural network). To determine errors in the neural network such an estimated render image can be compared with the ground-truth IBL render image. Errors can be determined using rendering loss. Rendering loss can generally be described as a pixel-wise loss between the estimated render image and the ground-truth IBL render image. Rendering loss can be the difference between the estimated render image and the ground-truth IBL render image using L2 loss. A non-limiting example of a render loss function is provided:

$$\mathcal{L}_{render} = L(\phi(I_{ibl}) - \phi(I_{rec}))$$

$I_{ibl}$ can generally be defined as the ground-truth lighting render for the HDR panorama image. $I_{rec}$ can generally be defined as the render from the neural network system. $L(\cdot, \cdot)$ compares the differences between two features. $\phi(\cdot)$ can generally be a function that is used to pre-process renders (e.g., by applying masks, tone mapping, etc.).

A weighted domain loss can also be determined. Domain loss can be determined using loss similar to generative adversarial loss. For instance, the neural network system can take the training LDR image and convert the image into a latent vector from which HDR lighting parameters can be estimated. A discriminator can be used to discriminate between a latent vector from a real LDR image and a latent vector from a synthetic LDR image. Using domain loss to train the neural network system ensures that the latent vectors used to predict HDR lighting parameters will be accurately estimated for real images as well as the synthetic images used to further train the neural network system. Domain loss forces the neural network system to learn weights such that synthetic and real images are mapped in roughly the same distribution. A non-limiting example of a domain adaptation loss function is provided:

$$\mathcal{L}_{da} = \min_{E} \max_{D} \mathbb{E}_{x \in S}\lfloor \log D(E(x)) \rfloor + \mathbb{E}_{x \in R}\lfloor \log(1 - D(E(x))) \rfloor$$

S can generally be a set synthetic LDR images. R can generally be the set of real LDR images. E can generally be the encoder of the neural network that compresses an input LDR image x into a latent vector z=E(x), D takes in z and tries to distinguish if z is from S or R, while E tries to confuse D by producing z that mimic the differences between S or R.

In this way, overall loss can be determined during training. A non-limiting example of overall loss is provided:

$$\mathcal{L} = \mathcal{L}_{render} + \mathcal{L}_{da}$$

Figure 6:
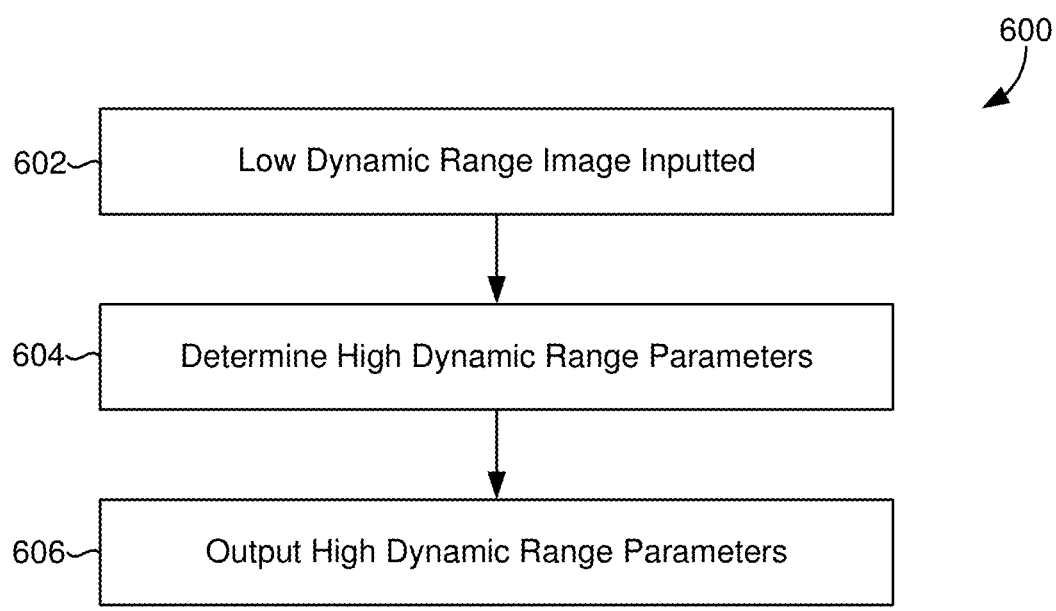
FIG. 6 depicts a process flow showing an embodiment for using a trained neural network system to estimate HDR lighting parameters from a LDR image, in accordance with embodiments of the present disclosure.

FIG. 6 provides a process flow showing an embodiment of method 600 for using a trained neural network system to estimate HDR lighting parameters from a LDR image, in accordance with embodiments of the present disclosure. Method 600 can be performed, for example by estimation engine 212, as illustrated in FIG. 2.

At block 602, a LDR image can be input into a trained neural network system (e.g., such as a system trained as described with reference to FIG. 3). The image can be input by a user taking a picture using a camera on a device and/or providing a URL to an image, for example. At block 604, the trained neural network system can estimate HDR lighting parameters for the input LDR image. The estimated HDR parameters can be output at block 606. Such estimated HDR parameters can include intensity, cloudiness, sun position, and environmental light). These output parameters can be displayed to a user on a user device, for example, on user devices 102a-102n and/or user device 114. Such a user device can be a computing device, such as computing device 1000 further described with reference to FIG. 10. Additionally, a user can interact with such output parameters, for example, by selecting to apply the parameters to an object placed into the image.

Figure 7:
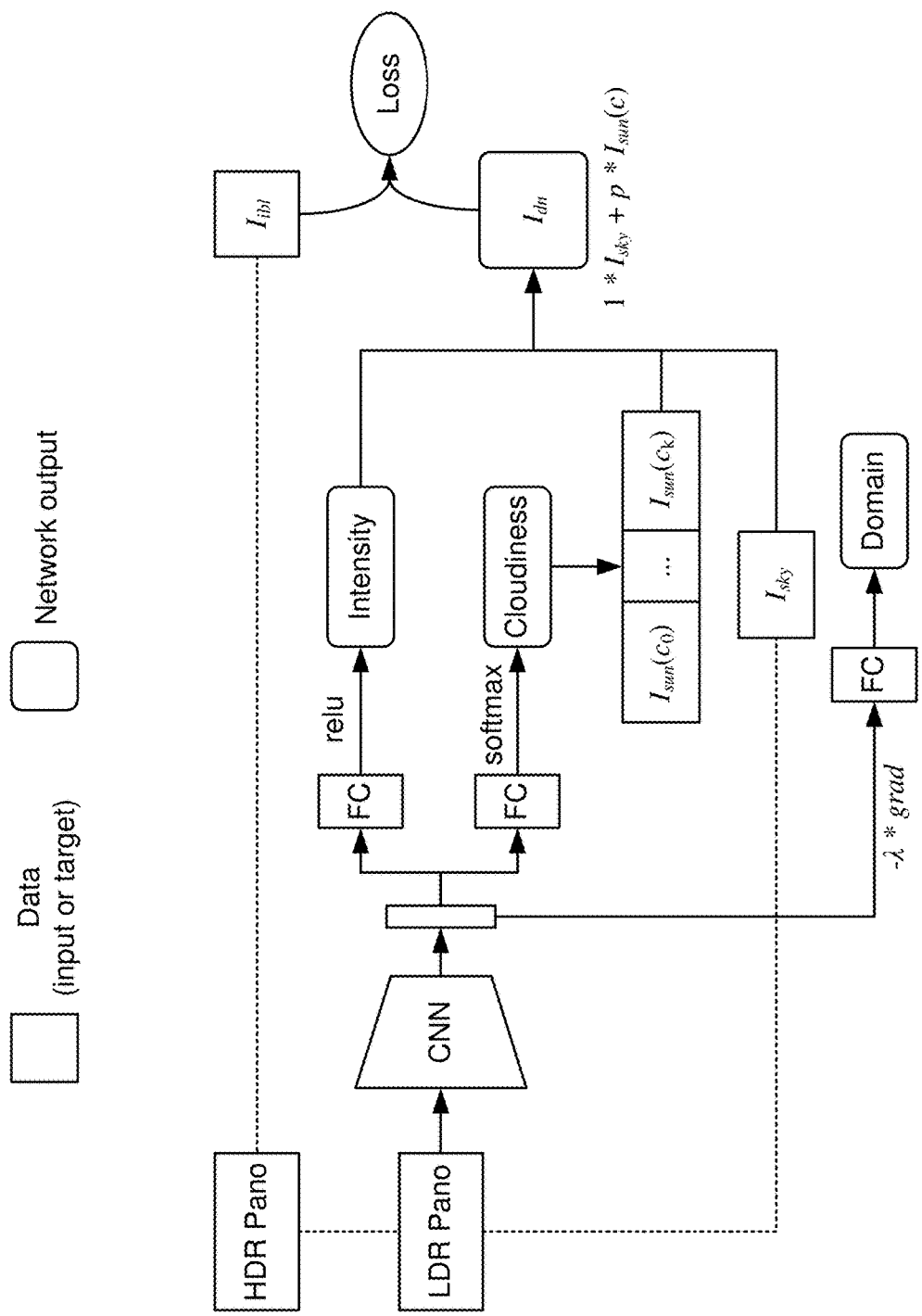
FIG. 7 depicts an example environment that can be used for training neural network system to estimate HDR parameters, in accordance with embodiments of the present disclosure.

FIG. 7 illustrates an example environment 700 that can be used for training neural network system 700 to estimate HDR parameters, in accordance with embodiments of the present disclosure. Training a neural network system can be performed using, for example, a convolutional neural network. Specifically, the architecture can contain a number of convolutional layers. After the convolutional layers, the network can have a fully connected layer that produces a latent representation.

Following the latent representation, there are fully connected layers for predicting intensity and cloudiness. In embodiments, the activation function for intensity is a rectifier (e.g., ReLu). Such a function returns 0 if it receives a negative input and for any positive value it returns that value back. The ReLu function can help the neural network system account for interaction effects and non-linear effects. In embodiments, the activation function for cloudiness is softmax. Such a function can return a value between (0, 1). Since cloudiness is based on a classification by determining a "bin" based on the cloudiness value.

The outputs from the fully connected layers for predicting intensity and cloudiness can be combined along with a known environment to generate an output estimated render image. This estimated render image can be compared with a ground-truth IBL image to determine any errors in the network. Such errors can be determined by finding rendering loss between the images.

The neural network also can have a domain adaptation branch that takes the latent representation (e.g., vector) and passes it through a fully connected layer to perform a binary classification (e.g., real/fake input image). The binary classification can be evaluated for any errors in the network. Such errors can be determined by finding cross-entropy loss.

During iterations the neural network is undergoing training, the loss in the network can be determined and fed back though the network to decrease the loss in further iterations. Iterations of training can be repeated for a sufficiently large number of training cycles, until the neural network system converges to a desired state (e.g., where errors fall below a predetermined threshold) such that the output produced reaches a desired threshold minimum of loss.

The neural network system can have previously been trained in a manner as described in reference to method 300 in FIG. 3. Upon conclusion of the training process, the trained neural network can be used determine HDR lighting properties for input LDR images.

Figure 10:
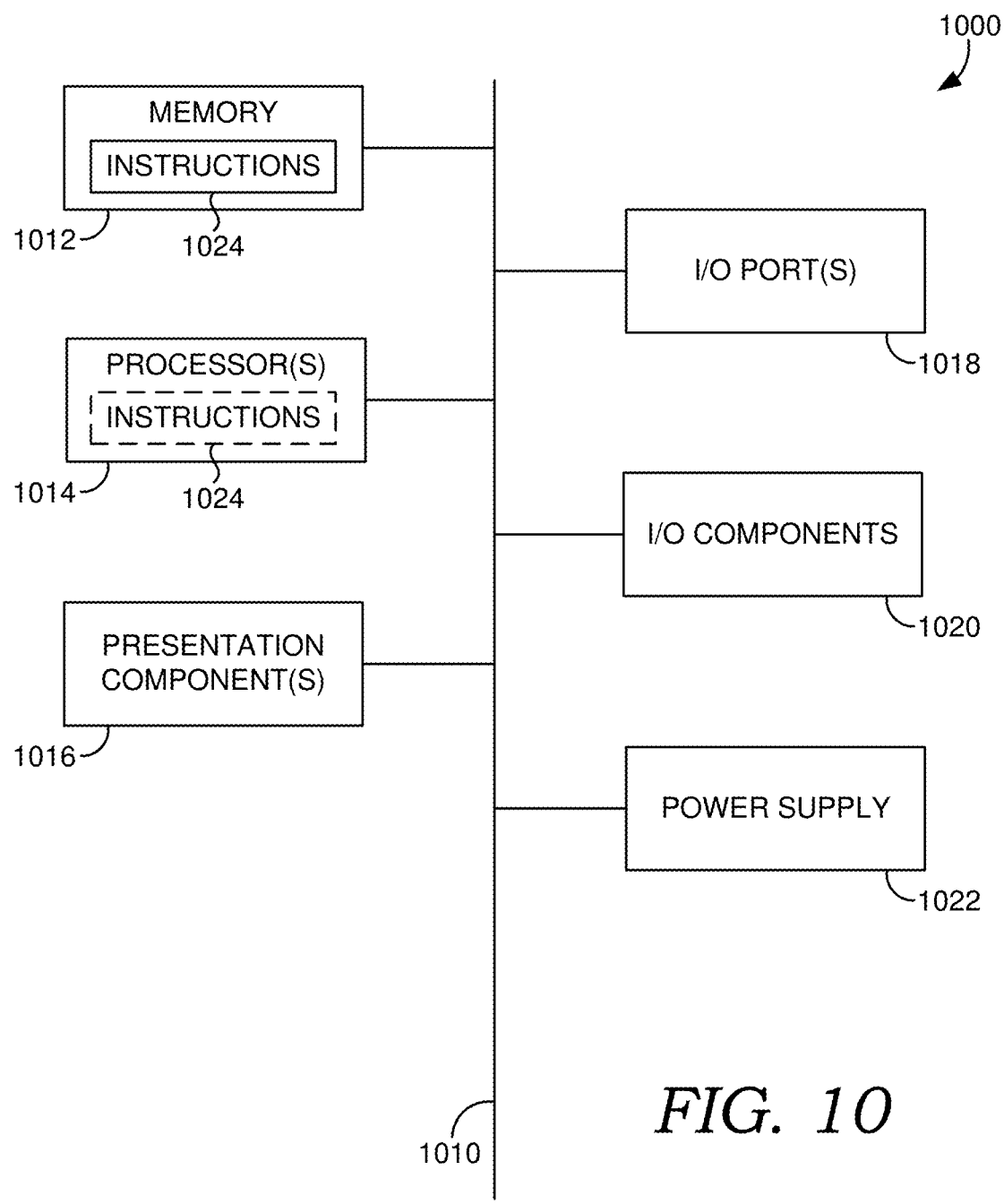
FIG. 10 is a block diagram of an example computing device in which embodiments of the present disclosure may be employed.

Having described embodiments of the present disclosure, FIG. 10 provides an example of a computing device in which embodiments of the present disclosure may be employed. Computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1000. Computing device 1000 may be equipped with depth cameras, such as stereoscopic camera systems, infrared camera systems, RGB camera systems, and combinations of these, for gesture detection and recognition. Additionally, computing device 1000 may be equipped with accelerometers or gyroscopes that enable detection of motion. The output of the accelerometers or gyroscopes may be provided to the display of computing device 1000 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for training a neural network system, the method comprising:
    inputting, into a neural network, a low-dynamic range training image;
    determining, using the neural network, high-dynamic range lighting parameters for the low-dynamic range training image;
    rendering a training scene using the high-dynamic range lighting parameters; and
    adjusting the neural network based on error associated with the training scene using a loss function.

2. The computer-implemented method of claim 1, wherein the low-dynamic range training image is a synthetic low-dynamic range image generated from a synthetic high-dynamic range image, wherein the synthetic high-dynamic range image is generated using a high-dynamic range sky image rendered with a rendered outdoor scene.

3. The computer-implemented method of claim 1, wherein the loss function includes a rendering loss or a domain loss.

4. The computer-implemented method of claim 3, wherein the rendering loss is determined using pixel-wise loss between the training scene and a ground-truth scene, wherein the training scene is a simple scene rendered using the high-dynamic range lighting parameters and the ground-truth scene is the simple scene rendered using known ground-truth lighting parameters.

5. The computer-implemented method of claim 3, wherein the domain loss is determined using cross-entropy loss to determine differences between a latent vector from a real low-dynamic range image and a latent vector from a synthetic low-dynamic range image.

6. The computer-implemented method of claim 1, wherein the training scene is rendered using pre-rendered scenes based on the determined high-dynamic lighting parameters.

7. The computer-implemented method of claim 1, further comprising:
    comparing the training scene with a ground-truth rendered scene, wherein the ground-truth rendered scene is pre-rendered using known high-dynamic range lighting parameters.

8. The computer-implemented method of claim 1, wherein determining the high-dynamic range lighting parameters, further comprises:
    estimating an intensity parameter;
    estimating a cloudiness parameter;
    obtaining an environmental parameter; and combining the intensity parameter, the cloudiness parameter, and the environmental parameter to estimate the high-dynamic range lighting parameters.

9. The computer-implemented method of claim 8, wherein the cloudiness parameter is determined using classification based on an estimated value.

10. The computer-implemented method of claim 8, further comprising:
selecting a first pre-rendered scene using the intensity parameter and the cloudiness parameter; and
obtaining a second pre-rendered scene using the environmental parameter.

11. The computer-implemented method of claim 10, further comprising:
combining the first pre-rendered scene and the second pre-rendered scene to generate the training scene.

12. One or more non-transitory computer-readable media having a plurality of executable instructions embodied thereon, which, when executed by one or more processors, cause the one or more processors to perform steps comprising:
receiving, via a neural network system, an input image, wherein the neural network system is trained by:
inputting a low-dynamic range training image,
determining lighting parameters for the low-dynamic range training image,
rendering a training scene using pre-rendered scenes selected using the lighting parameters, and
adjusting the neural network system based on error associated with the training scene;
generating, using the trained neural network system, high-dynamic lighting parameters for the input image; and
outputting, via the neural network system, the high-dynamic lighting parameters.

13. The media of claim 12, further comprising:
providing the high-dynamic lighting parameters to a user device.

14. The media of claim 12, wherein the error comprises loss determined using a rendering loss or a domain loss.

15. The media of claim 14, wherein the rendering loss is determined using pixel-wise loss between the training scene and a ground-truth scene, wherein the training scene is a simple scene rendered using the lighting parameters and the ground-truth scene is the simple scene rendered using known ground-truth lighting parameters.

16. The media of claim 14, wherein the domain loss is determined using cross-entropy loss to determine differences between a latent vector from a real low-dynamic range image and a latent vector from a synthetic low-dynamic range image.

17. The media of claim 16, wherein the domain loss is weighted, wherein a domain loss weight increases from zero at a beginning of training to one at a half-way point during training of the neural network system.

18. A computing system comprising:
means for training, via a processor, a neural network system, wherein the neural network system includes a neural network trained to determine high-dynamic range lighting parameters from input training low-dynamic range images; and
means for using, via the processor, the neural network system to determine the high-dynamic range lighting parameters from an input low-dynamic range image.

19. The computing system of claim 18, wherein the training comprises:
inputting, via the neural network system, a low-dynamic range training image;
determining, via the neural network system, lighting parameters for the low-dynamic range training image;
rendering a training scene using pre-rendered scenes selected using the lighting parameters; and
adjusting the neural network based on error associated with the training scene, wherein the error comprises a rendering loss or a domain loss.

20. The computing system of claim 19, wherein the rendering loss is determined using pixel-wise loss between the training scene and a ground-truth scene, wherein the training scene is a simple scene rendered using the lighting parameters and the ground-truth scene is the simple scene rendered using known ground-truth lighting parameters and wherein the domain loss is determined using cross-entropy loss to determine differences between a latent vector from a real low-dynamic range image and a latent vector from a synthetic low-dynamic range image.

\* \* \* \* \*